US012768654B2

(12) United States Patent
Jemili et al.

(10) Patent No.: US 12,768,654 B2
(45) Date of Patent: Oct. 20, 2026

(54) SENSOR APPARATUS, WEARABLE AND METHOD FOR OPERATING A SENSOR APPARATUS

(71) Applicant: Robert Bosch GmbH, Stuttgart (DE)

(72) Inventors: Amin Jemili, Kusterdingen (DE); Ruslan Khalilyulin, Munich (DE); Steffen Becker, Coswig (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 18/627,495

(22) Filed: Apr. 5, 2024

(65) Prior Publication Data

US 2024/0344829 A1 Oct. 17, 2024

(30) Foreign Application Priority Data

Apr. 17, 2023 (DE) ..................... 10 2023 203 436.0

(51) Int. Cl.

| | |
|---|---|
| ***G01H 11/06*** | (2006.01) |
| ***G01C 21/16*** | (2006.01) |
| ***G06F 3/0346*** | (2013.01) |
| ***H04R 1/10*** | (2026.01) |
| ***H04R 3/04*** | (2006.01) |
| ***H04R 25/00*** | (2006.01) |

(52) U.S. Cl.

CPC ........... *G01C 21/16* (2013.01); *G06F 3/0346* (2013.01)

(58) Field of Classification Search

CPC .......... G01H 11/00; G01H 11/06; H01R 1/00; H04R 3/00–04; H04R 25/00–04; G01C 21/16; G06F 3/00; G06F 3/03; G06F 3/0346

See application file for complete search history.

(56) References Cited

U.S. PATENT DOCUMENTS

| | | | | |
|---|---|---|---|---|
| 2011/0041614 | A1* | 2/2011 | Wolfmayr | G01H 11/06 73/654 |
| 2017/0078790 | A1* | 3/2017 | Yen | H04R 3/005 |
| 2022/0132245 | A1* | 4/2022 | Klimanis | H04R 3/005 |
| 2022/0248124 | A1* | 8/2022 | Marschall | H04R 1/1083 |
| 2023/0328462 | A1* | 10/2023 | Fabry | H04R 1/1016 381/317 |

FOREIGN PATENT DOCUMENTS

| | | | |
|---|---|---|---|
| DE | 102007057136 | A1 | 6/2009 |
| DE | 102020212733 | A1 | 4/2022 |
| DE | 102021201595 | A1 | 8/2022 |

* cited by examiner

*Primary Examiner* — Nguyen Q. Ha

(74) *Attorney, Agent, or Firm* — Norton Rose Fulbright US LLP

(57) ABSTRACT

A sensor apparatus. The sensor apparatus includes an interface which is designed to receive an external clock signal from an external component. The sensor apparatus also includes an inertial sensor device which is designed to generate an inertial sensor measurement signal, a structure-borne sound sensor device which is designed to generate a structure-borne sound measurement signal, and a control device which is designed to control the structure-borne sound sensor device with a control signal that depends on the external clock signal in order to operate the structure-borne sound sensor device at an operating frequency among a plurality of possible operating frequencies selected by the control device with the control signal.

10 Claims, 4 Drawing Sheets

SENSOR APPARATUS, WEARABLE AND METHOD FOR OPERATING A SENSOR APPARATUS

CROSS REFERENCE

The present application claims the benefit under 35 U.S.C. § 119 of German Patent Application No. DE 10 2023 203 436.0 filed on Apr. 17, 2023, which is expressly incorporated herein by reference in its entirety.

FIELD

The present invention relates to a sensor apparatus, to a wearable, and to a method for operating a sensor apparatus.

BACKGROUND INFORMATION

Wearable devices refer to devices worn on the body, in particular in-ear headphones, smartwatches, data glasses or the like. Such wearables comprise sensor apparatuses which can detect movements of the wearables. In particular, a user can generate control commands by movements in order to control certain functions of the wearable.

For example, in-ear headphones are worn wirelessly directly in the ear. In-ear headphones can comprise inertial measuring units, i.e. devices with typically a plurality of inertial sensors. For example, the inertial measuring units can comprise an acceleration sensor and a rotation rate sensor. The acceleration sensor can be used to recognize a tapping of the in-ear headphone by the user. By tapping the in-ear headphones once or multiple times, control commands can thereby be generated, for example in order to pause the playback of music. The rotation rate sensor can, for example, be used to adapt audio signals, such as music or audio in videos, depending on the orientation of the head of the user.

In addition, structure-borne sound sensors can be provided. These are acoustic acceleration sensors with a particularly high bandwidth, which are used in the in-ear headphones in order to measure the structure-borne sound generated by the vocal folds of the user.

The acoustic path of the structure-borne sound is influenced only very little by external noise influences. The structure-borne sound sensor thus mainly detects the speech of the user, wherein ambient noises can be suppressed during telephoning. The structure-borne sound sensor can thus be used for active noise suppression.

SUMMARY

The present invention provides a sensor apparatus, a wearable and a method for operating a sensor apparatus.

Preferred example embodiments of the present invention are disclosed herein.

According to a first aspect, the present invention to a sensor apparatus having an interface which is designed to receive an external clock signal. Furthermore, according to an example embodiment of the present invention, the sensor apparatus comprises an inertial sensor device which is designed to generate an inertial sensor measurement signal, a structure-borne sound sensor device which is designed to generate a structure-borne sound measurement signal, and a control device which is designed to control the structure-borne sound sensor device with a control signal that depends on the external clock signal in order to operate the structure-borne sound sensor device depending on the control signal at an operating frequency selected from a plurality of possible operating frequencies.

According to a second aspect, the present invention relates to a wearable comprising a sensor apparatus according to the first aspect present invention.

According to a third aspect, the present invention relates to a method for operating a sensor apparatus, wherein the sensor apparatus has an inertial sensor device which generates an inertial sensor measurement signal, and has a structure-borne sound sensor device which generates a structure-borne sound measurement signal. According to an example embodiment of the present invention, the structure-borne sound sensor device is actuated with a control signal which is dependent on an external clock signal in order to operate the structure-borne sound sensor device at an operating frequency among a plurality of possible operating frequencies specified by the control signal.

The present invention allows the simultaneous use of the inertial sensor device and the structure-borne sound sensor device, in particular if these are arranged in direct spatial proximity. By selecting a suitable operating frequency, crosstalk can be avoided.

The sensor apparatus can in particular be provided for a wearable, for example an in-ear headphone.

According to a preferred embodiment of the sensor apparatus of the present invention, the control device changes the operating frequency of the structure-borne sound sensor device if a difference of the operating frequency of the structure-borne sound sensor device from an operating frequency of the inertial sensor device falls below a given threshold value. As a result, excessively small differences between the operating frequencies of the structure-borne sound sensor device and the inertial sensor device are avoided, so that crosstalk can be prevented.

According to a preferred embodiment of the sensor apparatus of the present invention, the control device selects the operating frequency of the structure-borne sound sensor device in such a way that a difference of the operating frequency of the structure-borne sound sensor device from an operating frequency of the inertial sensor device is maximized or exceeds a given threshold value. Crosstalk can also be prevented by a sufficient difference of the operating frequency of the structure-borne sound sensor device from the operating frequency of the inertial sensor device.

According to a preferred embodiment of the present invention, the sensor apparatus comprises an analog-digital converter which is designed to oversample the structure-borne sound measurement signal by a factor n, wherein the control device is designed to set the factor n, wherein n is a natural number greater than 1. The corresponding operating frequency of the structure-borne sound sensor device is selected by selecting the factor n.

According to a preferred embodiment of the present invention, the sensor apparatus comprises an analog-digital converter which is designed to sample the structure-borne sound measurement signal. The sensor apparatus further comprises an upsampling device which is designed to convert the structure-borne sound measurement signal sampled by the analog-digital converter into a signal with a sampling rate greater by a factor n, wherein n is a natural number greater than 1. The control device can set the factor n, whereby the corresponding operating frequency of the structure-borne sound sensor device is selected.

According to a preferred embodiment of the sensor apparatus of the present invention, the inertial sensor device comprises at least one acceleration sensor and/or at least one rotation rate sensor. The operating frequency of the rotation rate sensor can be coupled to the operating frequency of the acceleration sensor. For example, the operating frequency of the rotation rate sensor is approximately twice the operating frequency of the acceleration sensor.

According to a preferred embodiment of the sensor apparatus of the present invention, an acceleration signal of the acceleration sensor is modulated onto a first carrier signal, and a rotation rate sensor signal of the rotation rate sensor is modulated onto a second carrier signal. The frequencies of the carrier signals correspond to the operating frequencies.

According to a preferred embodiment of the sensor apparatus of the present invention, the inertial sensor device and the structure-borne sound sensor device are integrated into a common package. A package is understood here to mean a chip housing, i.e. a casing of the inertial sensor device and the structure-borne sound sensor device, with connection points for coupling out or coupling in signals. By avoiding or at least reducing crosstalk by adapting the operating frequency of the structure-borne sound device, it is possible to integrate the inertial sensor device and the structure-borne sound sensor device into a common package. The installation area of the sensor apparatus can thereby be reduced, which is advantageous in particular for wearables with only little available space.

According to a preferred embodiment of the present invention, the sensor apparatus comprises a user interface for receiving a user signal, wherein the control device is designed to select the operating frequency of the structure-borne sound sensor device using the user signal.

Further advantages, features and details of the present invention will become apparent from the following description, in which various exemplary embodiments are described in detail with reference to the figures.

In all figures, identical or functionally identical elements and devices are provided with the same reference signs. The numbering of method steps serves the purpose of clarity and is generally not intended to imply a specific chronological order. In particular, a plurality of method steps may also be carried out simultaneously.

DETAILED DESCRIPTION OF EXAMPLE EMBODIMENTS

Figure 1:
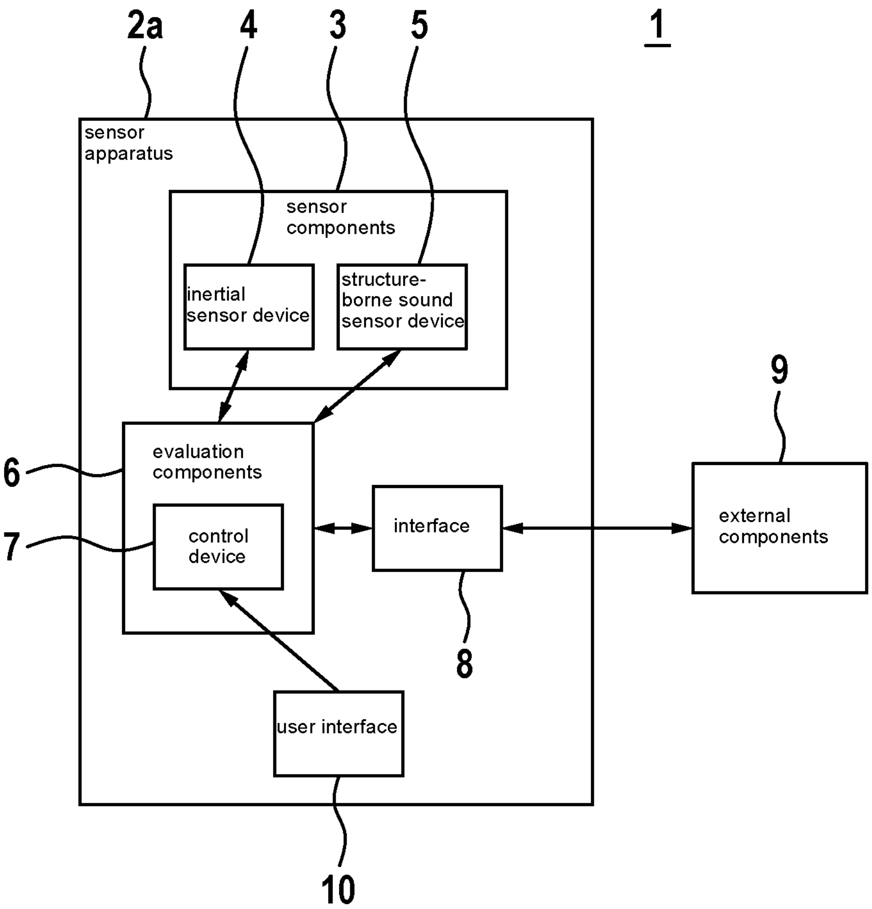
FIG. 1 shows a schematic block diagram of a wearable having a sensor apparatus according to one example embodiment of the present invention.

FIG. 1 shows a schematic block diagram of a wearable 1 having a sensor apparatus 2*a*. The wearable 1 can in particular be in-ear headphones, a smart watch, or smart glasses.

The sensor apparatus 2*a* comprises an interface 8 for receiving an external clock signal from external components 9 (e.g. a host). Furthermore, the sensor apparatus 2*a* comprises sensor components 3 with an inertial sensor device 4 and a structure-borne sound sensor device 5.

Furthermore, the sensor apparatus 2*a* comprises evaluation components 6 which comprise a control device 7. The evaluation components 6 can be designed, for example, as an application-specific integrated circuit (ASIC).

The inertial sensor device 4 generates an inertial sensor measurement signal. For this purpose, the inertial sensor device 4 can comprise at least one acceleration sensor and/or at least one rotation rate sensor. The inertial sensor device 4 preferably comprises both at least one acceleration sensor and at least one rotation rate sensor. An acceleration signal of the acceleration sensor is modulated onto a first carrier signal, and a rotation rate sensor signal of the rotation rate sensor is modulated onto a second carrier signal.

The structure-borne sound sensor device 5 further generates a structure-borne sound measurement signal. The structure-borne sound measurement signal can be modulated onto a third carrier signal.

The first carrier signal and the second carrier signal are substantially determined by the properties of the inertial sensor device 4. A carrier frequency of the second carrier signal, which corresponds to the rotation rate sensor, is defined by a resonant frequency of the rotation rate sensor. A carrier frequency of the first carrier signal, which corresponds to the acceleration sensor, is selected to be substantially equal to twice the carrier frequency of the second carrier signal. By contrast, the carrier frequency of the third carrier signal is determined on the basis of the external clock signal.

The control device 7 controls the structure-borne sound sensor device 5 with a control signal that depends on the external clock signal in order to operate the structure-borne sound sensor device 5 at an operating frequency among a plurality of possible operating frequencies selected by the control device 7 with the control signal. The control device 7 can also control the inertial sensor device 4.

Sensor signals of the sensor apparatus 2*a* can be output via the interface 8 to external components 9 on the basis of the inertial sensor measurement signal and the structure-borne sound measurement signal.

Furthermore, the sensor apparatus 2*a* comprises an optional user interface 10 for receiving a user signal. On the basis of the user signal, the control device 7 can select the operating frequency of the structure-borne sound sensor device 5.

The control device 7 can change the operating frequency of the structure-borne sound sensor device 5, for example, if a difference of the operating frequency of the structure-borne sound sensor device 5 from an operating frequency of the inertial sensor device 4 falls below a given threshold value. The control device 7 can also select the operating frequency of the structure-borne sound sensor device 5 in such a way that a difference of the operating frequency of the structure-borne sound sensor device 5 from an operating frequency of the inertial sensor device 4 is maximized or exceeds a given threshold value.

Figure 2:
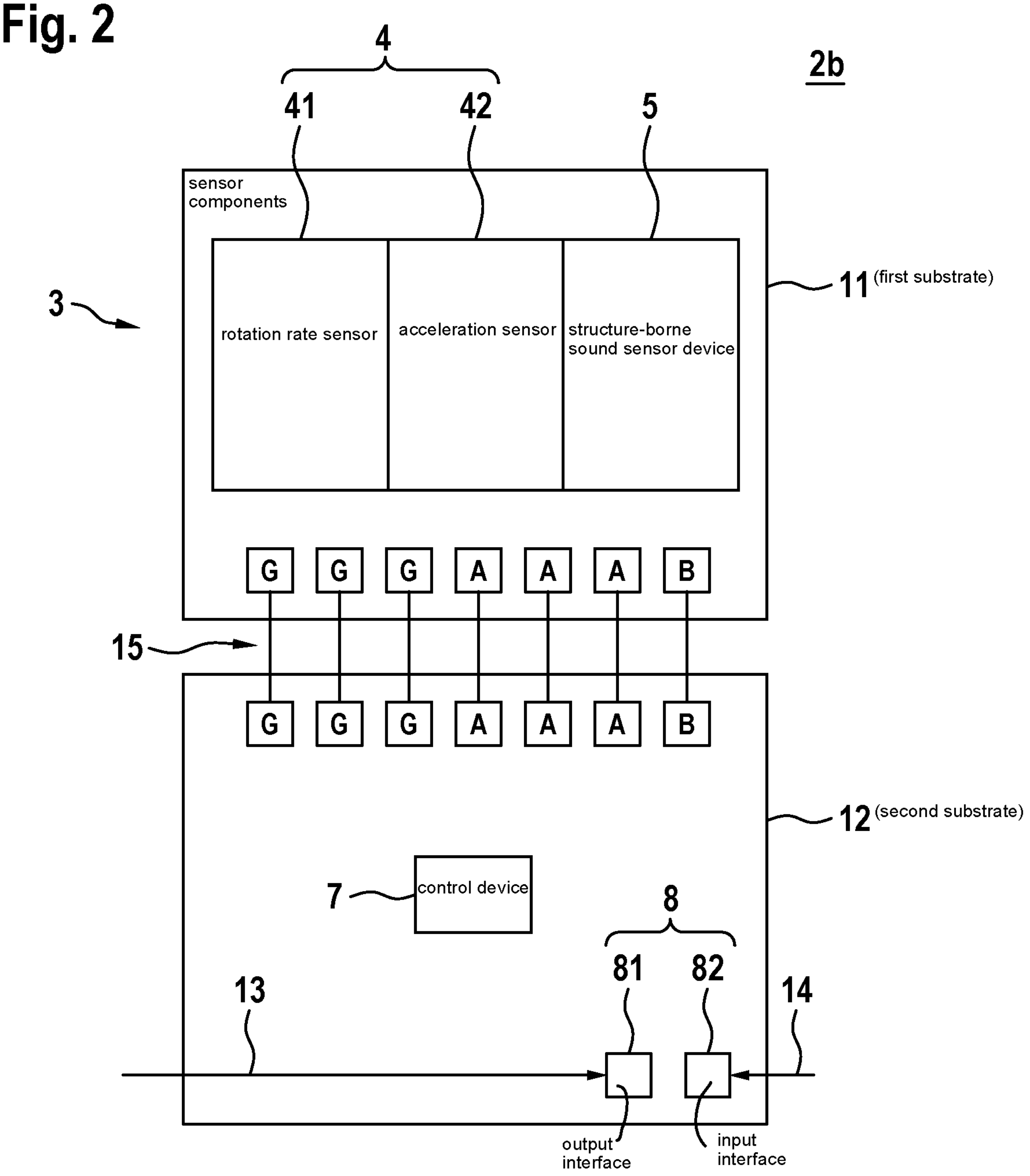
FIG. 2 shows a schematic block diagram of a sensor apparatus according to a further example embodiment of the present invention.

FIG. 2 shows a schematic block diagram of a further sensor apparatus 2*b*. This can substantially correspond to the sensor apparatus 2*a* shown above, and therefore only the special features will be addressed. The sensor apparatus 2*b* comprises a first substrate 11 and a second substrate 12, i.e., for example, a first and a second silicon die. The sensor components 3 are arranged on the first substrate 11, i.e. the inertial sensor device 4 and the structure-borne sound sensor device 5. The inertial sensor device 4 and the structure-borne sound sensor device 5 are integrated into a common package. The first substrate 11 with the components located thereon corresponds to a microelectromechanical system (MEMS).

The inertial sensor device 4 comprises a rotation rate sensor 41 and an acceleration sensor 42. The sensor devices 41, 42, 5 can in particular be capacitive sensor devices.

An application-specific integrated circuit (ASIC) is formed on the second substrate 12 and controls the rotation rate sensor 41, the acceleration sensor 42, or the structure-borne sound sensor device 5 via pins G, A, B and intermediate data connections 15, or receives and evaluates sensor signals from these components. The ASIC comprises the control device 7.

An interface 8 comprises an input interface 82 for receiving the external clock signal 14 and an output interface 81 for outputting sensor data. The control signal output at the output interface 81 must be output at a frequency specified by the external clock signal 14.

The substrates 11, 12 are applied to a common substrate, connected to the connecting lines 15 (e.g. bonding wires), and the components are then cast with plastics material.

Figure 3:
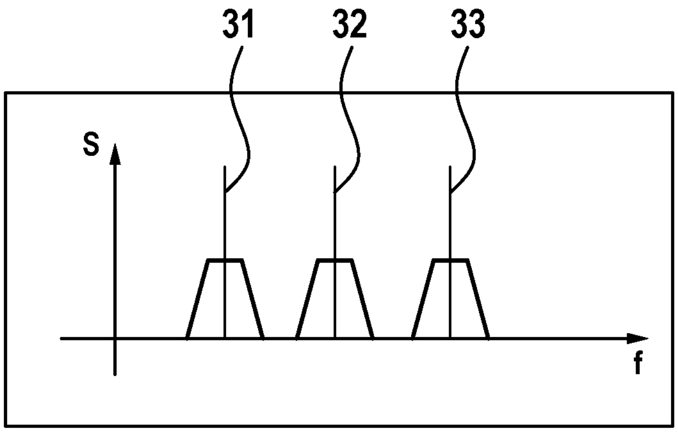
FIG. 3 shows schematic operating frequencies for a first sensor apparatus according to an example embodiment of the present invention.

FIG. 3 shows schematic operating frequencies for a first sensor apparatus. An operating frequency 32 of the acceleration sensor 42 corresponds to twice an operating frequency 31 of the rotation rate sensor 41. The operating frequency 33 of the structure-borne sound sensor device 5 sufficiently differs from the operating frequencies 31, 32 of the acceleration sensor 42 or rotation rate sensor 41 that no overlap of the corresponding frequency bands occurs.

Figure 4:
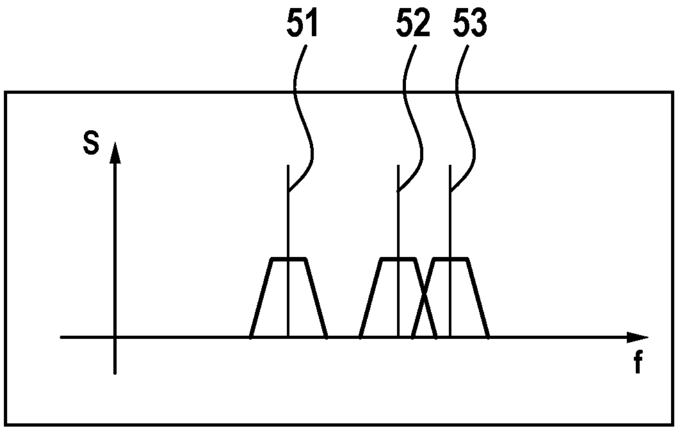
FIG. 4 shows schematic operating frequencies for a second sensor apparatus according to an example embodiment of the present invention.

FIG. 4 shows schematic operating frequencies for a second sensor apparatus. Here, an operating frequency 51 of the rotation rate sensor 41 and thus also an operating frequency 52 of the acceleration sensor 42 is at a higher frequency, so that an operating frequency 53 of the structure-borne sound sensor device 5 lies relatively close to the operating frequency 52 of the acceleration sensor 42. This results in an overlapping of the frequency bands about the operating frequency 53 of the structure-borne sound sensor device 4, or the operating frequency 52 of the acceleration sensor 42. The crosstalk produced thereby can be avoided by shifting the operating frequency 51 of the rotation rate sensor 41 and the operating frequency 52 of the acceleration sensor 42 to lower values.

The differences between the operating frequencies indicated in FIGS. 3 and 4 result substantially from manufacturing tolerances of the rotation rate sensor 41. The operating frequency of the rotation rate sensor 41 can vary by about 20 percent due to production, for example, i.e. the operating frequency can be, for example, 800 kHz+/−20%. The operating frequency of the structure-borne sound sensor device 5 can be adapted after production.

The variation depends on mechanical stress and also on temperature. It can also be provided to adapt the operating frequency of the structure-borne sound sensor device 5 during operation of the sensor apparatus 2*a*, 2*b*.

According to one embodiment, the operating frequencies of the rotation rate sensor 41 and the acceleration sensor 43 are specified, while the operating frequency of the structure-borne sound sensor device 5 can be adapted. According to further embodiments, only the operating frequency of the rotation rate sensor 41 is specified, while the operating frequencies of the acceleration sensor 42 and the structure-borne sound sensor device 5 can be adapted.

Figure 5:
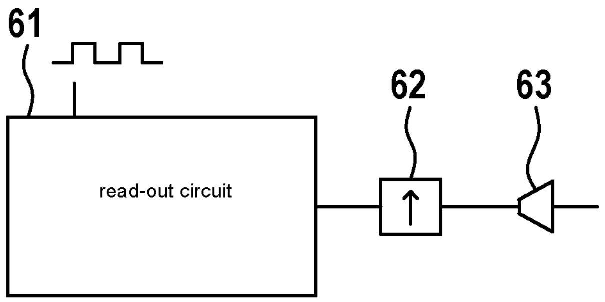
FIG. 5 shows a schematic block diagram of a component of a sensor apparatus according to one example embodiment of the present invention.

FIG. 5 shows a schematic block diagram of a component of a sensor apparatus, in particular one of the sensor apparatuses 2*a*, 2*b* described above. A read-out circuit 61 reads out a sensor signal (structure-borne sound measurement signal) of the structure-borne sound sensor device 5. The sensor apparatus further comprises an analog-digital converter 63, in particular a sigma-delta analog-digital converter. The analog-digital converter 63 samples the structure-borne sound measurement signal with an oversampling factor n specified by an oversampling device 62, wherein n can be selected, for example, from 3, 4 or 5. The signal can be sampled both at the rising and the falling edge, which results in a factor of 2. If a clock frequency of the external clock signal corresponds, for example, to 1024 kHz, then the following modes result:

$$\text{Mode 1 (factor } n=3\text{): operating frequency } 1024\text{ kHz}/(2\cdot 3)=170.7\text{ kHz},$$

$$\text{Mode 2 (factor } n=4\text{): operating frequency } 1024\text{ kHz}/(2\cdot 4)=128.0\text{ kHz},$$

$$\text{Mode 3 (factor } n=5\text{): operating frequency } 1024\text{ kHz}/(2\cdot 5)=102.4\text{ kHz}.$$

At the output interface 81, the measurement data are output again with the clock frequency of 1024 kHz specified by the clock signal.

By selecting the factor n, the operating frequency of the structure-borne sound sensor device 5 can be shifted in order to avoid crosstalk.

Figure 6:
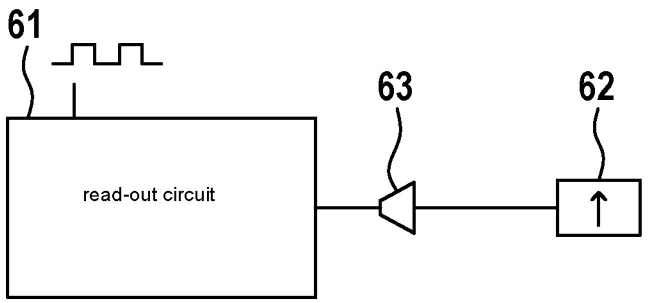
FIG. 6 is a schematic block diagram of a component of a sensor apparatus according to a further example embodiment of the present invention.

FIG. 6 shows a schematic block diagram of a component of a sensor apparatus, in particular one of the sensor apparatuses 2*a*, 2*b* described above. In comparison with the component shown in FIG. 5, the upsampling device 62 and the analog-digital converter 63 are interchanged, i.e. the upsampling takes place after the sampling by the analog-digital converter 63. The upsampling device 62 is thus designed to convert the structure-borne sound measurement signal sampled by the analog-digital converter 63 into a signal with a sampling rate higher by a factor n, wherein n is a natural number greater than 1.

Figure 7:
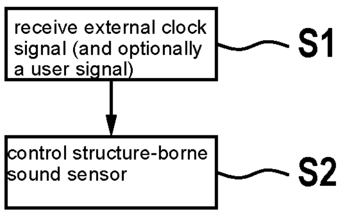
FIG. 7 shows a flow chart of a method for operating a sensor apparatus according to one example embodiment of the present invention.

FIG. 7 shows a flow chart of a method for operating a sensor apparatus, in particular one of the sensor apparatuses 2*a*, 2*b* described above. The sensor apparatus 2*a* has an inertial sensor device which generates an inertial sensor measurement signal, and a structure-borne sound sensor device which generates a structure-borne sound measurement signal.

In a first method step S1, an external clock signal and optionally a user signal are received.

In a second method step S2, the structure-borne sound sensor device 5 is controlled with a control signal that is dependent on the external clock signal in order to operate the structure-borne sound sensor device 5 depending on the control signal at an operating frequency selected from a plurality of possible operating frequencies, optionally depending on the user signal.

What is claimed is:

1. A sensor apparatus, comprising:

an interface configured to receive an external clock signal from an external component;

an inertial sensor device configured to generate an inertial sensor measurement signal;

a structure-borne sound sensor device configured to generate a structure-borne sound measurement signal; and a control device configured to control the interial sensor device and the structure-borne sound sensor device with a control signal that depends on the external clock signal to operate the structure-borne sound sensor device at an operating frequency among a plurality of possible operating frequencies selected by the control device with the control signal, so at to avoid crosstalk between the interial sensor device and the structure-born sound sensor device.

2. The sensor apparatus according to claim 1, wherein the control device is configured to change the operating frequency of the structure-borne sound sensor device when a difference of the operating frequency of the structure-borne sound sensor device from an operating frequency of the inertial sensor device falls below a given threshold value.

3. The sensor apparatus according to claim 1, wherein the control device is configured to select the operating frequency of the structure-borne sound sensor device in such a way that a difference of the operating frequency of the structure-borne sound sensor device from an operating frequency of the inertial sensor device is maximized or exceeds a given threshold value.

4. The sensor apparatus according to claim 1, further comprising:

an analog-digital converter configured to oversample the structure-borne sound measurement signal with a factor n, wherein the control device is configured to set the factor n, wherein n is a natural number greater than 1.

5. The sensor apparatus according to claim 1, further comprising:

an analog-digital converter configured to sample the structure-borne sound measurement signal; and an upsampling device configured to to convert the structure-borne sound measurement signal sampled by the analog-digital converter into a signal having a sampling rate higher by a factor n, wherein n is a natural number greater than 1.

6. The sensor apparatus according to claim 1, wherein the inertial sensor device includes at least one acceleration sensor and/or at least one rotation rate sensor.

7. The sensor apparatus according to claim 1, wherein the inertial sensor device and the structure-borne sound sensor device are integrated into a common package.

8. The sensor apparatus according to claim 1, further comprising:

a user interface configured to receive a user signal, wherein the control device is configured to select the operating frequency of the structure-borne sound sensor device using the user signal.

9. A wearable, comprising:

a sensor apparatus including:

an interface configured to receive an external clock signal from an external component, an inertial sensor device configured to generate an inertial sensor measurement signal, a structure-borne sound sensor device configured to generate a structure-borne sound measurement signal, and a control device configured to control the inertial sensor device and the structure-borne sound sensor device with a control signal that depends on the external clock signal to operate the structure-borne sound sensor device at an operating frequency among a plurality of possible operating frequencies selected by the control device with the control signal, so at to avoid crosstalk between the interial sensor device and the structure-born sound sensor device.

10. A method for operating a sensor apparatus, wherein the sensor apparatus includes an inertial sensor device which generates an inertial sensor measurement signal, and includes a structure-borne sound sensor device which generates a structure-borne sound measurement signal, the method comprising:

using a control device to control the inertial sensor device and the structure-borne sound sensor device with a control signal that depends on an external clock signal from an external component to operate the structure-borne sound sensor device at an operating frequency among a plurality of possible operating frequencies selected by the control device with the control signal, so at to avoid crosstalk between the interial sensor device and the structure-born sound sensor device.

* * * * *